No. 648,794. Patented May 1, 1900.
E. E. RICE.
FLY KILLER BRUSH.
(Application filed Feb. 20, 1899.)
(No Model.)
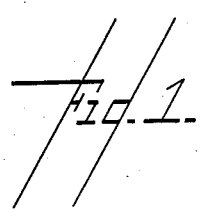
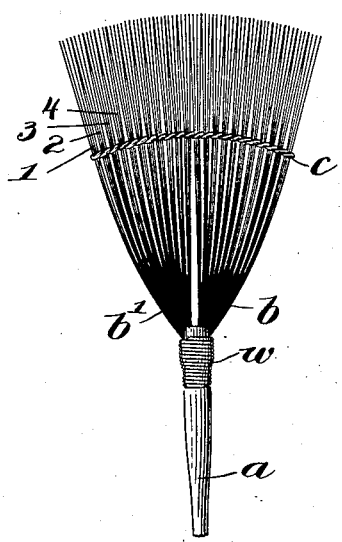
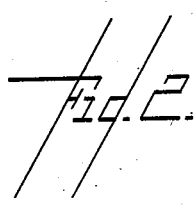
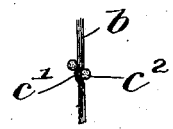
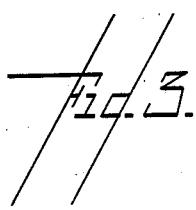
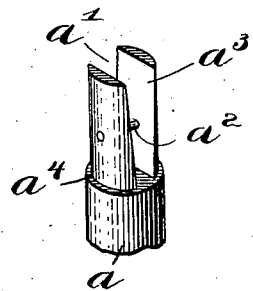
WITNESSES
Charles F. Logan.
Edward G. Allen.
INVENTOR
Edward E. Rice.
BY Crosby Gregory
ATT'YS.

UNITED STATES PATENT OFFICE.

EDWARD E. RICE, OF NEW DURHAM, NEW HAMPSHIRE.

FLY-KILLER BRUSH.

SPECIFICATION forming part of Letters Patent No. 648,794, dated May 1, 1900.

Application filed February 20, 1899. Serial No. 706,237. (No model.)

*To all whom it may concern:*

Be it known that I, EDWARD E. RICE, of New Durham, county of Strafford, State of New Hampshire, have invented an Improvement in Fly-Killer Brushes, of which the following description, in connection with the accompanying drawings, is a specification, like letters on the drawings representing like parts.

My invention is an improvement in wire brushes, and has particular reference to that class thereof which are thin, flat, and broad, and commonly known as "fly-killers." The usual form of this kind of brush when made of wire is something like a broom; but because of the smooth surface of the wire and the difficulty of holding it in place it has been found exceedingly difficult to retain the individual wires in the handle and to keep them in their proper relative spread-out positions, as the wires would persist in slipping on each other and becoming loose and disarranged in the handle, and at their free ends they would become uneven and disarranged because of the bending back and forth in use. In order to hold the brush-wires in their proper spread positions, it has been customary to sew or stitch the wires into numerous small bunches, which tend thereby to spread and maintain the flat shape and relative positions of the wires at about their mid-length, the stitching being commonly with some strong cord; but in spite of the firmest stitching and tying of the cord which was possible it would nevertheless slip on the smooth surface of the wires, and as the fly-killer in use is best considerably at or near the handle the result has been that these holding-cords would creep along the wires, due to the sliding motion of the latter relatively to each other in each bunch, so that ultimately the cord would be uneven, having crept either toward the handle or toward the tips, proving a source of considerable trouble and tending to hold the brush-wires out of proper position instead of maintaining them in proper position. Accordingly I have devised the herein-described fly-killer, in which all the above difficulties are obviated by a very inexpensive and neat construction, which will be set forth in detail in the following description, reference being had to the accompanying drawings, in which I have shown a preferred embodiment of the invention.

In the drawings, Figure 1 represents in side elevation a brush of the fly-killer type made in accordance with my invention. Fig. 2 is a sectional detail thereof, showing the means of preventing the creeping tendency of the cord on the wire. Fig. 3 is a perspective view of the holding end of the handle, whereby the brush-wires are given lateral support and maintained rigidly in place.

As already stated, one special difficulty in this style of brush is that the wires have comparatively-little frictional hold on each other, and therefore the problems of their manufacture are quite different and more difficult than in the manufacture of ordinary fiber and bristle brushes, and the wires are exceedingly hard to keep in place, but tend almost inevitably to work loose from the handle, either slipping out past each other or working around on each other out of place, so as to become crossed or bunched improperly. Accordingly I provide a handle $a$ of any suitable material, herein shown as wood, and make a transverse longitudinal slit $a'$ in its outer end, in which I secure a holding wire or pin $a^2$. One object of providing this special construction of handles is to give a relatively-large supporting or staying surface $a^3$, against which the brush-wires may rest compactly and solidly without any chance of shifting, the two opposite surfaces formed by the sides of the slit acting as abutments, which not only support the wires, but maintain them unyieldingly in proper spread position, whereas if the brush-wires were simply bent at their middle and then bound about by a binding-wire in the usual manner the wires would naturally bunch together in a more or less cylindrical shape, and even if originally flattened out they would tend to assume a cylindrical shape in use and gradually distort the proper shape of the brush; but by providing the shaped handle shown in Fig. 3 this cannot take place. Moreover, by providing the cross-pin $a^2$ it becomes absolutely impossible for any of the wires to slip out, because this pin being small gets a sharp bite on the wires where they are bent sharply back on themselves in the formation of the bunch which constitutes the brush. Having provided the handle as stated, the proper complement of wires required for a brush is taken, and they are inserted beneath the wire or pin $a^2$ and then bent sharply upwardly at their middle, the two ends being brought together into bunches $b\ b'$, as shown in Fig. 1, and are tightly bound in place by being wrapped substantially as shown by a binding-wire $w$, which packs the brush-wires solidly in the slit $a'$ of the handle and causes them to hug tenaciously against the cross-pin $a^2$, this binding-wire $w$ being preferably engaged at its lower end by a flange $a^4$, provided on the handle. The brush-wires having been thus tightly bound in immovable position in the handle are spread out in the shape substantially as shown in Fig. 1, and are then stitched or tied together by a cord or other means $c$, being separated into a series of small bunches or groups, as indicated at 1 2 3 4, &c., Fig. 1.

In order to prevent the stitches of the cord $c$ from sliding or working up and down on the smooth wires, I provide a kink $c'$ in the wires and place one of the strands of the cord in the hollow of this kink, as indicated at $c^2$, Fig. 2, and the other strand at the adjacent bend on the opposite side of the wire, this kink being formed by crimping the wires preferably from one extreme edge of the brush to the opposite edge, although for some purposes it is sufficient to crimp simply the outermost bunches of the brush, thereby retaining the cord immovably at its ends, and it will be understood that certain other of the small bunches may be crimped without necessarily crimping all of the bunches, although I prefer the latter construction, as shown. Having provided the wires with the kinks $c'$ and stitched them in spread-out relation, as shown, it becomes impossible for the cord to creep along the wires in either construction.

While I prefer the exact construction as shown, it will be understood that I am not limited thereto, but that many changes, omissions, and additions may be had without departing from my invention, and that I am not otherwise limited than as hereinafter expressed in the claims.

Having described my invention, what I claim as new, and desire to secure by Letters Patent, is—

1. A wire brush or broom, comprising a handle and brush-wires, said handle having a transverse longitudinal slit in its brush end, said slit providing opposite substantially-parallel plane supporting-walls, and a cross-pin spanning said slit above the bottom thereof, the brush-wires being held in said slit beneath said cross-pin, bent sharply on themselves over said pin and packed tightly in the slit, and suitable binding means encompassing said handle and the brush-wires, said brush-wires being spread out into small bunches and held in spread position by a tying-cord, the said wires being provided with a kink in which said cord is tied, substantially as described.

2. A wire brush or broom, comprising a handle and brush-wires, the handle having a slit $a'$ in its holding end, and a cross-pin removed from the bottom of said slit, the brush-wires being bent beneath said pin and packed snugly in said slit, a binding-wire holding said wires in place in said handle, and said brush-wires being spread out and provided with transverse kinks intermediate their ends and the handle, and a tying-cord engaging said wires at said kinks for maintaining the wires in spread-out position, substantially as described.

3. In a wire brush containing brush-wires spread out in a flat series of small bunches, the herein-described means of securing them in permanent relative position, consisting of providing kinks in said wires and fastening the wires together by cords tied into said kinks, substantially as described.

In testimony whereof I have signed my name to this specification in the presence of two subscribing witnesses.

EDWARD E. RICE.

Witnesses:
PERCY S. JONES,
FRANCIS A. DODGE.